United States Patent
Sei et al.

(10) Patent No.: US 6,601,972 B2
(45) Date of Patent: Aug. 5, 2003

(54) DEUTERIUM LAMP BOX AND PORTABLE LIGHT SOURCE APPARATUS

(75) Inventors: Yujiro Sei, Hamamatsu (JP); Masaki Ito, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 39 days.

(21) Appl. No.: 10/043,304

(22) Filed: Jan. 14, 2002

(65) Prior Publication Data

US 2002/0060909 A1 May 23, 2002

Related U.S. Application Data

(63) Continuation-in-part of application No. PCT/JP00/04787, filed on Jul. 17, 2000.

(30) Foreign Application Priority Data

Jul. 16, 1999 (JP) ........................................... P11-203557

(51) Int. Cl.[7] .............................. P21V 1/00; P21V 11/00
(52) U.S. Cl. ..................... 362/236; 362/240; 362/244; 362/231
(58) Field of Search .......................... 362/236, 235, 362/240, 244, 253, 231, 84

(56) References Cited

U.S. PATENT DOCUMENTS

| | | | |
|---|---|---|---|
| 5,552,669 A | 9/1996 | Ikedo et al. | 313/613 |
| 5,587,625 A | 12/1996 | Ikedo et al. | 313/613 |
| 5,619,101 A | 4/1997 | Ikedo et al. | 313/581 |
| 5,633,563 A | 5/1997 | Ikedo et al. | 313/614 |
| 5,646,487 A | 7/1997 | Ikedo et al. | 315/94 |
| 5,684,363 A | 11/1997 | Ikedo et al. | 313/613 |
| 5,698,945 A | 12/1997 | Ikedo et al. | 313/613 |

FOREIGN PATENT DOCUMENTS

| | | |
|---|---|---|
| JP | 6-310101 | 11/1994 |
| JP | 8-222186 | 8/1996 |
| JP | 8-226891 | 9/1996 |
| JP | 8-233659 | 9/1996 |
| JP | 8-329732 | 12/1996 |
| JP | 9-27213 | 1/1997 |

*Primary Examiner*—Stephen Husar
*Assistant Examiner*—Shawn Payne
(74) *Attorney, Agent, or Firm*—Morgan, Lewis & Bockius LLP

(57) ABSTRACT

In a deuterium lamp box in accordance with the present invention, a wavelength of light different from that of a deuterium lamp can be forwardly let out from a light exit opening. Namely, when the deuterium lamp of a see-through type is lit, the light generated from the deuterium lamp can be let out from the light exit opening. When a second lamp is lit while the deuterium lamp is turned off, the light generated from the second lamp 85 passes through the deuterium lamp while in a state collected by a lens, and is let out from the light exit opening. When the deuterium lamp and the second lamp are lit at the same time, different wavelengths of light are let out from the light exit opening while in a mixed state. Thus, three kinds of light can be made depending on how the lamps are lit, whereby this lamp box is considered to have a versatility much higher than that of a lamp box accommodating only one lamp.

10 Claims, 9 Drawing Sheets

US 6,601,972 B2

DEUTERIUM LAMP BOX AND PORTABLE LIGHT SOURCE APPARATUS

RELATED APPLICATION

This is a continuation-in-part application of application Ser. No. PCT/JP00/4787 filed on Jul. 17, 2000, now pending.

BACKGROUND OF THE INVENTION

1. Field of the Invention

The present invention relates to a lamp box for accommodating a deuterium lamp, and a portable light source apparatus which can be carried to work sites.

2. Related Background Art

Conventionally known as a technique in such a field is Japanese Patent Application Laid-Open No. HEI 8-329732. The lamp box disclosed in this publication is constructed as a block body, into which a deuterium lamp is inserted, whereas a predetermined wavelength of light emitted from the deuterium lamp is guided to a measurement optical system. The lamp box has ventilation holes for passing cooling winds therethrough, whereas the deuterium lamp is appropriately cooled by the cooling winds.

SUMMARY OF THE INVENTION

However, the following problem exists in the above-mentioned conventional deuterium lamp box. Namely, the light emitted from the lamp box is that from the deuterium lamp alone. When utilizing this lamp box in a measurement apparatus, objects to be measured can be illuminated with no wavelength of light other than that from the deuterium light as a matter of course. This lamp box is not supposed to mount lamps other than the deuterium lamp, and accommodates only the deuterium lamp for emitting a single wavelength of light, without taking account of versatility. Meanwhile, Japanese Patent Application Laid-Open No. HEI 8-233659 discloses an apparatus in which two kinds of lamps are arranged, from which respective light beams are taken out by use of an optical system.

In order to overcome the problem mentioned above, it is an object of the present invention to provide a deuterium lamp box and portable light source apparatus having a high versatility in particular.

The deuterium lamp box in accordance with a first aspect comprises a lamp accommodating body for inserting a deuterium lamp therein; a light exit opening, formed in the lamp accommodating body, for forwardly letting out light emitted from the deuterium lamp; a light entrance opening, formed in the lamp accommodating body, opposing the light exit opening; a condenser lens disposed on the light entrance opening side on an optical axis passing the light exit opening and the light entrance opening; and a second lamp disposed behind the light entrance opening on the optical axis.

In this deuterium lamp box, two kinds of lamps can be arranged in series, which makes it possible to forwardly let out a wavelength of light different from that of the deuterium lamp by way of one light exit opening. Namely, when a see-through type deuterium lamp is lit, light generated by the deuterium lamp can be let out from the light exit opening. When the second lamp is lit while the deuterium lamp is turned off, the light generated from the second lamp passes through the deuterium lamp while in a state collected by the lens, and is let out from the light exit opening. Further, when the deuterium lamp and the second lamp are lit at the same time, different wavelengths of light are let out from the light exit opening while in a mixed state. Thus, three kinds of light can be made depending on how the lamps are lit, whereby this lamp box is considered to have a versatility much higher than that of a lamp box accommodating only one kind of lamp. The deuterium lamp utilized in this lamp box is not limited to those of see-through type, whereas typical deuterium lamps can also be utilized as a matter of course as long as they are used such that the second lamp is not lit. In this regard, the lamp box has a quite high versatility, which is realized by providing the lamp box with the second lamp and the condenser lens while arranging the light exit opening and the light entrance opening on the optical axis.

Preferably, in the lamp box in accordance with a second aspect, a lamp house in which the condenser lens and the second lamp are disposed in front and rear parts is made detachable with respect to the lamp accommodating body. In this case, since the lamp house accommodating the condenser lens and second lens therein is employed, the second lamp required by a user can easily be mounted, while it becomes easier to replace the second lamp and a focusing lens at the same time and maintain them. These components can be assembled into the lamp box while in a state where the matching between the second lamp and the condenser lens is optimized, and various kinds of second lamps can be utilized, whereby its usable range is widened greatly.

Preferably, in the lamp box in accordance with a third aspect, the condenser lens is disposed in the lamp accommodating body, the second lamp is disposed in the lamp house, and the lamp house is made detachable with respect to the lamp accommodating body. In this case, since the lamp house accommodating the second lamp therein is employed, the required second lamp can easily be mounted, and it becomes easier to replace and maintain the second lamp alone.

Preferably, in the lamp box in accordance with a fourth aspect, the lamp accommodating body is integrally formed with an optical passage outwardly extending from the light entrance opening, whereas the condenser lens and the second lens are disposed in front and rear parts of the optical passage, respectively. This configuration aims at reducing the number of components and lowering the cost.

Preferably, in the lamp box in accordance with a fifth aspect, the second lamp is made insertable with respect to a lamp insertion port formed on the optical axis. When such a configuration is employed, since the lamp insertion port is positioned on the optical axis, it becomes easier to set the light emission point of the second lamp onto the optical axis, which makes it possible to securely mount the lamp.

Preferably, in the lamp box in accordance with a sixth aspect, the condenser lens is disposed on the light exit opening side on the optical axis. When such a configuration is employed, light generated from the deuterium lamp can securely be emitted while being collected.

Preferably, in the lamp box in accordance with a seventh aspect, the deuterium lamp is of a see-through type which emits light forward and forwardly passes therethrough light incident thereon from behind. When such a lamp is employed, the light of the second lamp can pass through the deuterium lamp, so as to be emitted from one light exit opening.

The portable light source apparatus in accordance with an eighth aspect includes a lamp box, secured within a housing, for accommodating a deuterium lamp generating a predetermined wavelength of light; and a power unit, secured within the housing, for driving the deuterium lamp; wherein the lamp box comprises a lamp accommodating body for inserting a deuterium lamp therein; a light exit opening, formed in the lamp accommodating body, for forwardly letting out light emitted from the deuterium lamp; a light entrance opening, formed in the lamp accommodating body, opposing the light exit opening; a condenser lens disposed on the light entrance opening side on an optical axis passing the light exit opening and the light entrance opening; and a second lamp disposed behind the light entrance opening on the optical axis.

This light source apparatus is an apparatus which can forwardly let out a wavelength of light different from that of the deuterium lamp byway of the light exit opening. Namely, when a see-through type deuterium lamp is lit, light generated by the deuterium lamp can be let out from the light exit opening. When the second lamp is lit while the deuterium lamp is turned off, the light generated from the second lamp passes through the deuterium lamp while in a state collected by the lens, and is let out from the light exit opening. Further, when the deuterium lamp and the second lamp are lit at the same time, different wavelengths of light are let out from the light exit opening while in a mixed state. Thus, three kinds of light can be made depending on how the lamps are lit, whereby this apparatus is considered to have a versatility much higher than that of a lamp box accommodating only one kind of lamp. The deuterium lamp utilized in this apparatus is not limited to those of see-through type, whereas typical deuterium lamps can also be utilized as a matter of course as long as they are used such that the second lamp is not lit. In this regard, this apparatus is considered to be an apparatus having a quite high versatility and a quite wide range of application.

Preferably, the deuterium lamp box in accordance with a ninth aspect has a light guide tube secured to the lamp box so as to extend the light exit opening of the lamp box, and the condenser lens disposed within the light exit opening of the lamp box and held and secured between the light guide tube and the lamp accommodating body. When such a configuration is employed, it becomes possible for the condenser lens to be built in easily and appropriately, so that the condenser lens can be disposed so as to approach the deuterium lamp, whereby a larger quantity of light can be collected, which can increase the optical intensity. Also, the securing by sandwiching improves the workability in assembling the condenser lens.

Preferably, in the deuterium lamp box in accordance with a tenth aspect, the deuterium lamp is of a see-through type which emits light forward and forwardly passes therethrough light incident thereon from behind. When such a lamp is employed, the light of the second lamp can pass through the deuterium lamp, so as to be emitted from one light exit opening.

DESCRIPTION OF THE PREFERRED EMBODIMENT

In the following, preferred embodiments of the deuterium lamp box and portable light source apparatus in accordance with the present invention will be explained in detail with reference to the drawings.

Figure 1:
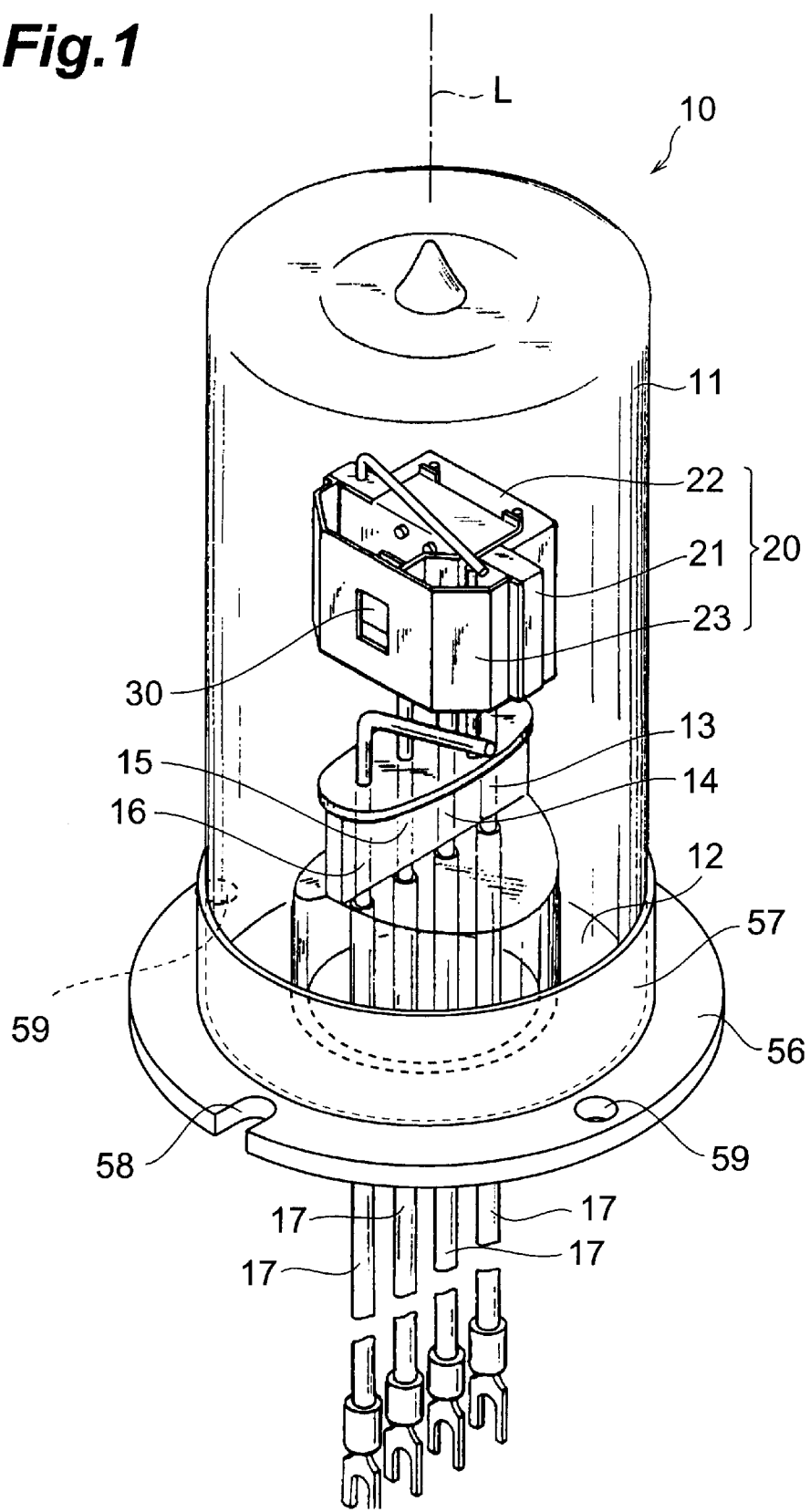
FIG. 1 is a perspective view showing an embodiment of the deuterium lamp employed in the deuterium lamp box and light source apparatus in accordance with the present invention.

FIG. 1 is a perspective view showing a deuterium lamp employed in the portable light source apparatus in accordance with the present invention. The deuterium lamp 10 is not only a discharge lamp of a side-on type which emits ultraviolet rays (200 to 400 nm) from a side thereof, but also of a see-through type which can pass therethrough a different kind of light from behind. Such a deuterium lamp can illuminate an object to be inspected placed in front of the lamp 10 with light generated from another lamp disposed behind the lamp 10.

In this deuterium lamp 10, a light-emitting unit assembly 20 is accommodated within a cylindrical envelope 11 made of glass, whereas about several Torr of deuterium gas (not depicted) are encapsulated therein. Formed at the bottom of the envelope 11 is a stem 12 made of glass. The envelope 11 is formed from UV-transmitting glass, silica glass, or the like having a favorable UV transmissivity.

In the stem 12, four lead pins 13 to 16 are arranged and secured in parallel in a row, whereas each of the lead pins 13 to 16 penetrates through the stem 12 and is coated with an insulating material so as to be drawn out as a lead 17, which is connected to an external power supply (not depicted). The light-emitting unit assembly 20 has a front face cover 23 made of a metal (Ni or SUS) or ceramics, which is disposed in a front part; an anode support member 22 made of ceramics, which is disposed in a rear part; and a spacer 21 made of ceramics, which is disposed between the anode support member 22 and the front face cover 23.

The configuration of the light-emitting unit assembly 20 will now be explained in detail.

Figure 2:
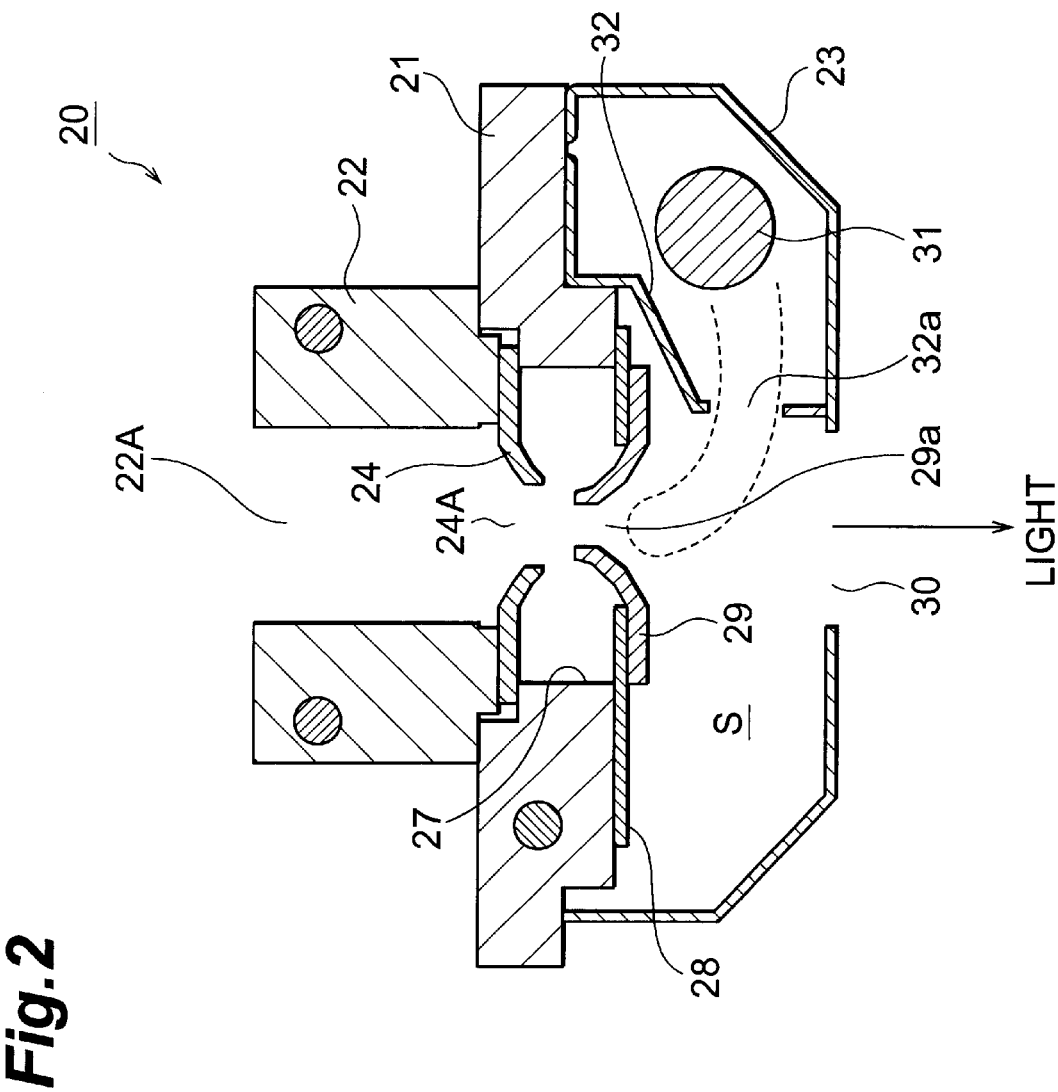
FIG. 2 is a transverse sectional view of FIG. 1.

As shown in FIGS. 1 and 2, an anode 24 made of a metal is secured to the leading end of the lead pin 14. The anode 24 is fixed at the leading end of the lead pin 14. The anode support member 22 is formed with a light entrance opening 22A extending in a direction orthogonal to the tubular axis L, whereas a light-transmitting hole 24A concentric therewith is formed in the anode 24. Therefore, the light entrance opening 22A and the light-transmitting hole 24A enable the light from behind to enter the light-emitting unit assembly 20.

The back face of the anode 24 abuts against the anode support member 22 so as to be supported thereby, whereas the anode support member 22 is integrally formed from ceramics having an electrically insulating property and a high thermal conductivity. Therefore, the anode support member 22 can act as a heat sink with respect to the anode unit 24 at a high temperature, thereby efficiently emanating the heat accumulated in the light-emitting unit assembly 20 to the outside.

The spacer 21 disposed in front of the anode support member 22 is formed with a rectangular opening part 27, which is located in front of the light entrance opening 22A. A focusing electrode fixing plate 28, made of a metal, is disposed so as to abut against the spacer 21. A focusing electrode unit 29 made of a metal is secured to the front face of the focusing electrode fixing plate 28. The focusing electrode fixing plate 28 is secured to the front face of the spacer 21, whereas the focusing electrode unit 29 has a focusing opening 29a disposed so as to face to the opening part 27 of the spacer 21 and have an opposing relationship with the light-transmitting hole 24A.

The front face cover 23 is formed so as to have a substantially U-shaped cross section and secured to the front face of the spacer 21. Formed at the center of the front face cover 23 is an opening window 30 for projecting ultraviolet rays, which is in an opposing relationship with the focusing opening 29a and light-transmitting hole 24A. Hence, since the light entrance opening 22A, light-transmitting hole 24A, focusing opening 29a, and opening window 30 are arranged in a row, the light having entered the light-emitting unit assembly 20 is emitted from the opening window 30. Disposed within a space S formed by the front face cover 23 and the spacer 21 is a spiral hot cathode 31 for generating thermions. The hot cathode 31 is disposed at a position shifted from the optical path, i.e., at a side portion within the front face cover 23.

Between the hot cathode 31 and the focusing electrode unit 29, a discharge current plate 32 made of a metal (Ni or SUS) or ceramics is disposed at a position shifted from the optical path. One end of the discharge current plate 32 is secured to the front face of the spacer 21, whereas the other end abuts against the inner wall face of the front face cover 23. Also, the discharge current plate 32 is formed with a slit 32a which communicates the hot cathode 31 and the focusing electrode unit 29 to each other, thereby shaping the current of the thermions generated from the hot cathode 31.

Actions of the above-mentioned deuterium lamp 10 will now be explained.

First, during a period of about 20 seconds before discharging, a power of about 10 W is supplied from an external power supply (not depicted) to the hot cathode 31, so as to preheat the latter. Thereafter, an AC open voltage of about 150 V is applied between the hot cathode 31 and the anode 24, so as to prepare for arc discharge.

After the preparation, a trigger voltage of 350 to 500 V is applied between the hot cathode 31 and the anode 24. At this time, the thermions emitted from the hot cathode 31 pass through the elongated slit 32a of the discharge current plate 32, so as to reach the anode 24 while being converged by the focusing opening 29a of the focusing electrode unit 29. Subsequently, arc discharge occurs in front of the focusing opening 29a, and ultraviolet rays taken out from arc balls caused by the arch discharge pass through the opening window 30 and then are transmitted through the peripheral face of the envelope 11 made of glass, so as to be emitted to the outside. At this time, the anode unit 24 and anode support member 29 attain a high temperature exceeding several hundred ° C., and this heat is kept on being emitted to the outside by the anode support member 22 and spacer 21 made of ceramics when appropriate.

Another kind of lamp 85 is disposed behind the deuterium lamp 10. As the lamp 85 is lit, the light having entered the light entrance opening 22A passes through the light-transmitting hole 24A and the focusing opening 29a, so as to be emitted from the opening window 30. When the deuterium lamp 10 and the lamp 85 are lit at the same time, different wavelengths of light can be mixed within the light-emitting unit assembly 20, and thus mixed light can be emitted from the opening window 30. Therefore, light having a wide range of wavelength which cannot be generated by the deuterium lamp 10 alone can be emitted from the opening window 30.

A portable light source apparatus utilizing the above-mentioned deuterium lamp 10 will now be explained.

Figure 3:
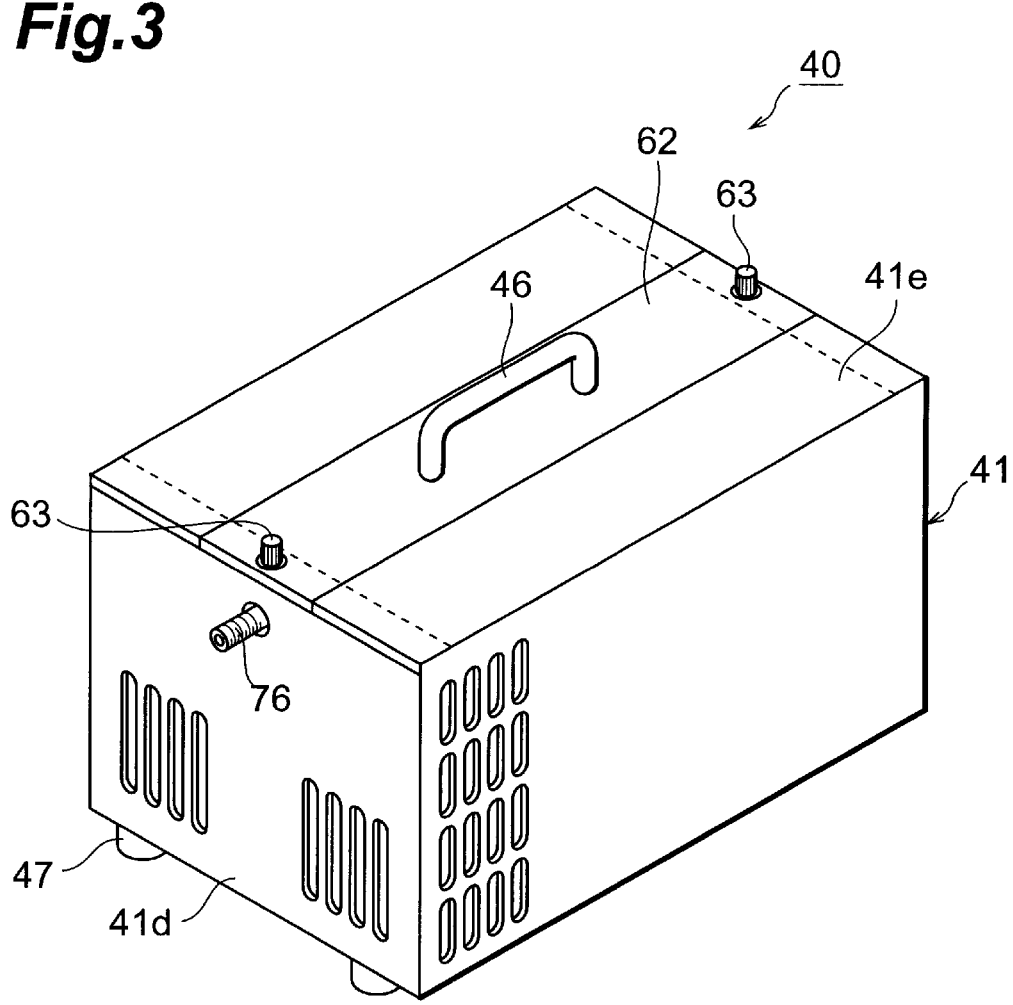
FIG. 3 is a perspective view showing the exterior of the portable light source apparatus in accordance with the present invention.
Figure 4:
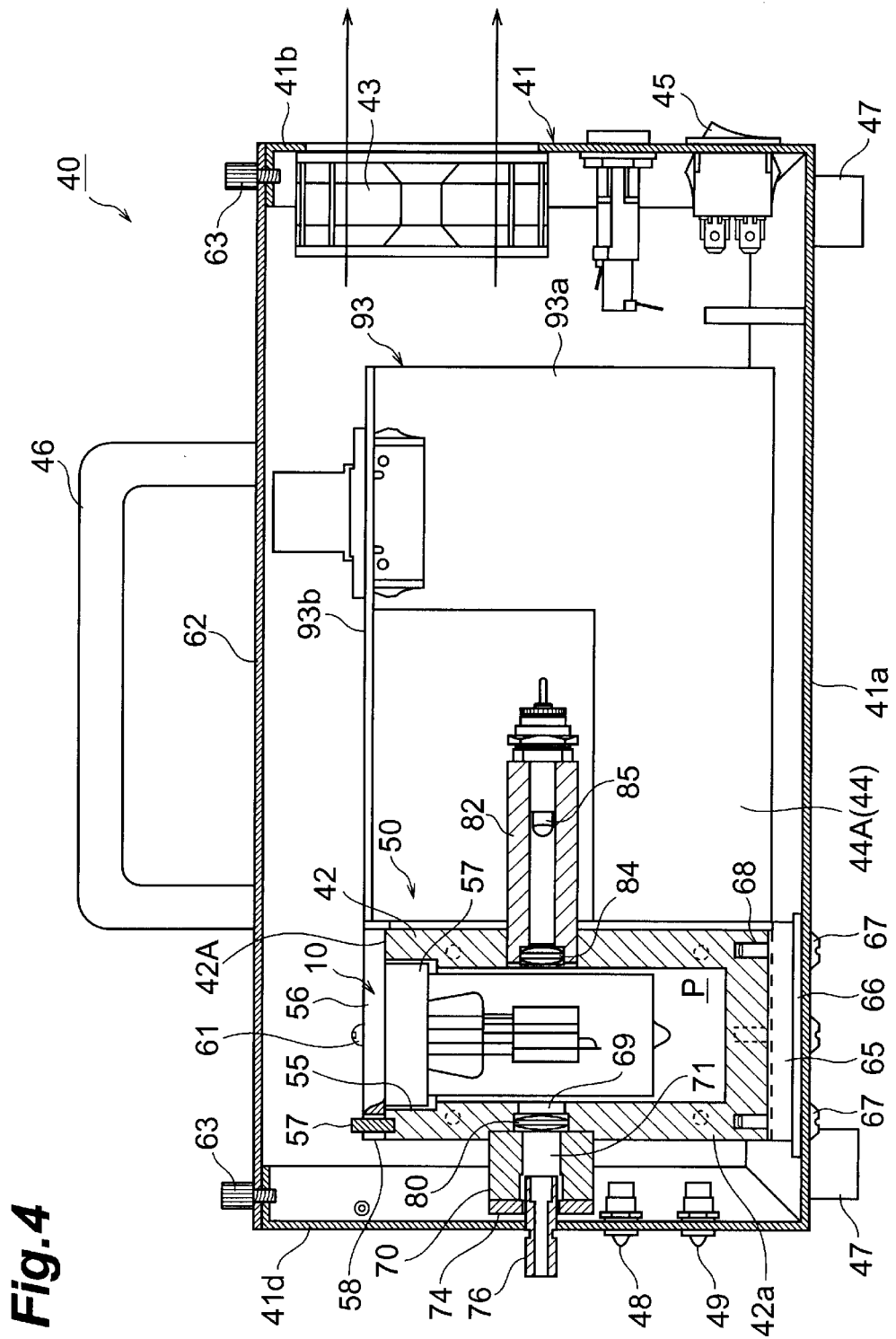
FIG. 4 is a sectional view of the light source apparatus shown in FIG. 3.
Figure 5:
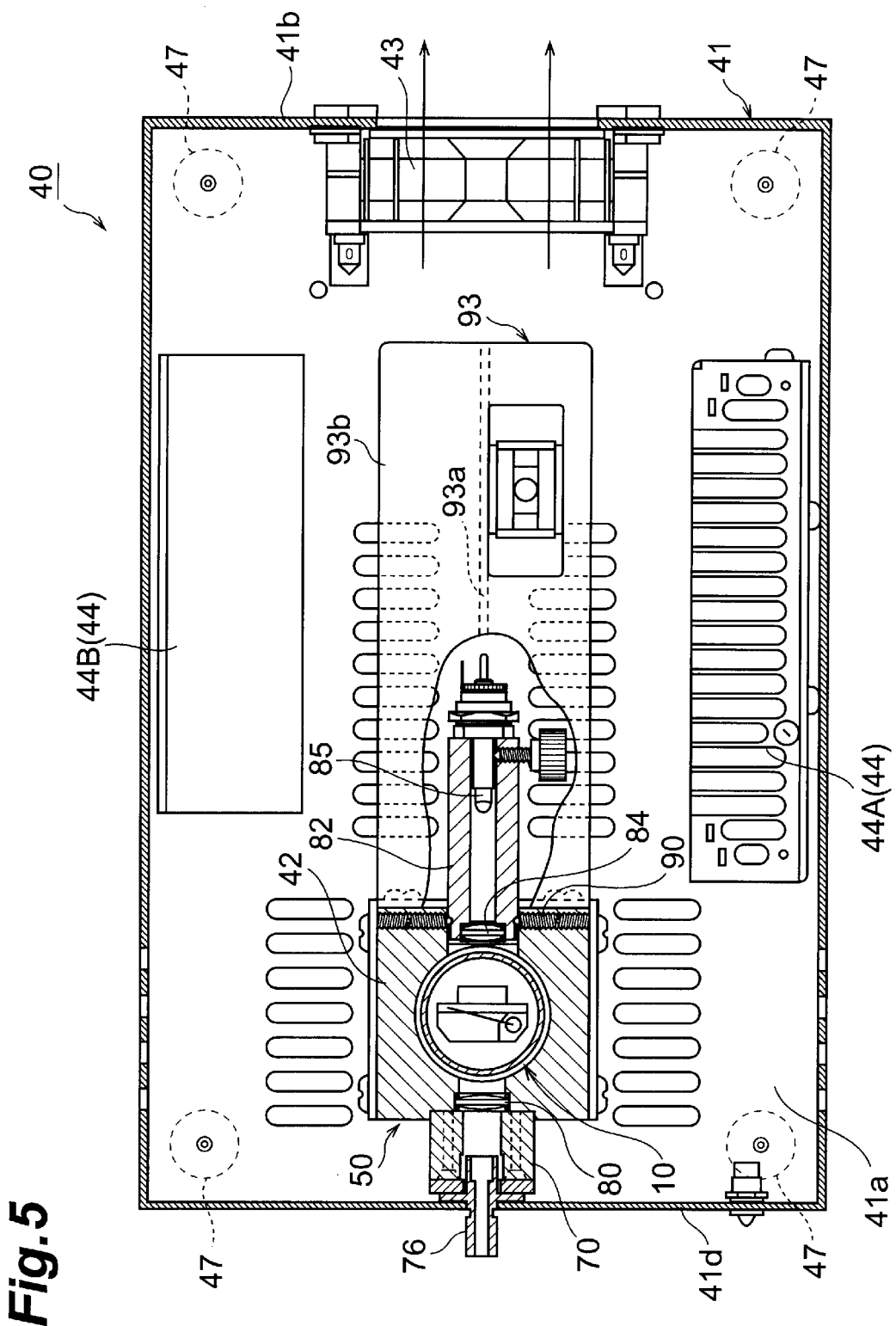
FIG. 5 is a sectional view of the light source apparatus shown in FIG. 3.

As shown in FIGS. 3 to 5, a light source apparatus 40 is a very compact, lightweight, easy-to-carry apparatus having a length of about 26 cm, a width of about 16 cm, a height of about 12 cm, and a weight of about 3 kg. The light source apparatus 40 has a housing 41, made of steel, having a rectangular parallelepiped form. Within the housing 41, a deuterium lamp box (hereinafter simply referred to as "lamp box") 50 made of aluminum for accommodating the deuterium lamp 10 is secured to a bottom faceplate 41a in a front part, whereas a cooling fan 43 for producing a forcible flow of air within the housing 41 is secured to a back faceplate 41b in a rear part.

Between the cooling fan 43 and the lamp box 50, a power unit 44 is secured to the bottom faceplate 41a, whereas the power unit 44 is divided into left and right parts by an AC/DC converter 44A and a lamp driving power circuit 44B. When a power switch 45 disposed at the back faceplate 41b of the housing 41 is turned ON, a desirable current is supplied to the deuterium lamp 10 by way of the power unit 44, whereby the cooling fan 43 starts rotating.

In view of the carrying and handling outdoors and indoors, a handle 46 and rubber-made legs 47 are attached to the light source apparatus 40. Also, the housing 41 is provided with an LED lamp 48 for indicating the ON/OFF of the power, and an LED lamp 49 for indicating the ON/OFF of the deuterium lamp 10 in order to improve the convenience of operators.

Thus, the portable light source apparatus 40 is an apparatus for lighting/blinking the deuterium lamp 10. Meanwhile, the deuterium lamp 10 does not operate stably when simply cooled. This is because of the fact that the deuterium lamp 10 maintains a low pressure state (e.g., about $\frac{1}{100}$ atm) therewithin, thus having an output characteristic which is quite susceptible to temperature changes.

Hence, such a deuterium lamp 10 is accommodated in the lamp accommodating body 42 and, at the same time, in the housing 41 in order for the influence of temperature changes in the outside air to become very small. Namely, the deuterium lamp 10 is enveloped not only by the lamp accommodating body 42 but also by the housing 41, thereby being accommodated in a double shield structure. As a result, the temperature change of the housing 41, which is the most likely to be affected by the outside air, is harder to be transmitted to the deuterium lamp 10, whereby the latter can be utilized for a long period of time without taking account of the changes in weather during outdoor operations or influences of air conditioners and the like during indoor operations.

As shown in FIGS. 4 and 5, the lamp box 50 has the lamp accommodating body 42 formed into a rectangular parallelepiped from a hollow block made of aluminum in view of thermal conduction. In the lamp accommodating body 42, the deuterium lamp 10 is inserted into a cylindrical lamp accommodating space P from thereabove while in a state where its stem 12 side is oriented upward. Since the leads 17 are located on the upper side, operations for connecting them to respective terminals become easier within the housing 41. Also, at the time of replacing the lamp, the operation can be carried out such that the opening 55 for inserting the lamp in the lamp accommodating body 42 is looked into from thereabove, whereby the lamp 10, which is likely to break, can be replaced safely.

Here, as shown in FIGS. 1 and 4, a flange part 56 made of a metal is secured to the deuterium lamp 10 by an adhesive or the like in order to facilitate the mounting thereof to the lamp accommodating body 42. From an end part of a tubular barrel 57 surrounding the stem 12 side of the deuterium lamp 10, the flange part 56 projects in a direction perpendicular to the tubular axis L of the lamp 10. Since such a flange part 56 is provided, the operation for replacing the lamp can be carried out while the flange part 56 is picked up by fingers, so that no fingers come into contact with the glass part of the envelope 11, whereby the luminance can be prevented from becoming uneven due to smudges such as fingerprints.

The flange part 56 abuts against the upper end 42A of the lamp accommodating body 42. As a result, the deuterium lamp 10 can easily be accommodated in the lamp accommodating body 42 while in a suspended state. Also, since the lamp accommodating body 42 and the flange part 56 of the deuterium lamp 10 abut against each other, the flange part 56 provides an appropriate lid for the lamp accommodating space P, whereby cooling winds can appropriately be prevented from entering the lamp accommodating space P.

Further, it is necessary that the mounting position of the deuterium lamp 10 be made constant within the lamp accommodating body 42. Therefore, a positioning pin 57 projects from the upper end 42A of the lamp accommodating body 42, so as to be inserted into a cutout groove 58 of the flange part 56. Consequently, the lamp replacing operation can be carried out securely without mistaking the front and rear of the deuterium lamp 10 for each other. For securing the deuterium lamp 10 to the lamp accommodating body 42, the flange part 56 is formed with screw insertion holes 59. Hence, when screws 61 are threaded into the lamp accommodating body 42 through the screw insertion holes 59, the flange part 56 is firmly secured to the lamp accommodating body 42.

For facilitating the lamp replacing operation, the housing 41 is provided with a detachable upper lid 62 facing to the lamp insertion opening 55 of the lamp accommodating body 42. The upper lid 62 can be opened and closed upon attaching and detaching roulette screws 63. When such an upper lid 62 is employed, the upper lid 62 can easily be removed during the lamp replacing operation, so that the operation can be carried out while the lamp accommodating body 42 is looked into from thereabove, whereby the lamp 10, which is easy to break, can be replaced safely.

The lamp accommodating body 42 is secured so as to be separated from the bottom faceplate 41a of the housing 41. Specifically, a sheet-like heat insulating member (first heat insulating plate) 65 made of ceramics is inserted between the bottom faceplate 41a and the bottom face 42B of the lamp accommodating body 42. As a result, the housing 41 directly in contact with the outside air and the lamp accommodating body 42 directly accommodating the deuterium lamp 10 are thermally insulated from each other, whereby temperature changes in the housing 41 are harder to be transmitted to the lamp accommodating body 42.

A sheet-like vibration insulating member 66 made of rubber is disposed between the heat insulating member 65 and the bottom faceplate 41a of the housing 41. The vibration insulating member 66, heat insulating member 65, and lamp accommodating body 42 are secured to the bottom faceplate 41a of the housing 41 by four screws 67. In this case, each screw 67 is inserted from below the bottom faceplate 41a so as to be threaded into its corresponding screw hole 68 in the lamp accommodating body 42. When the vibration insulating member 66 is employed as such, the vibration received by the housing 41 from the outside is harder to be transmitted to the lamp accommodating body 42, so that the deuterium lamp 10 is appropriately prevented from vibrating, whereby its output characteristic is stabilized.

Figure 6:
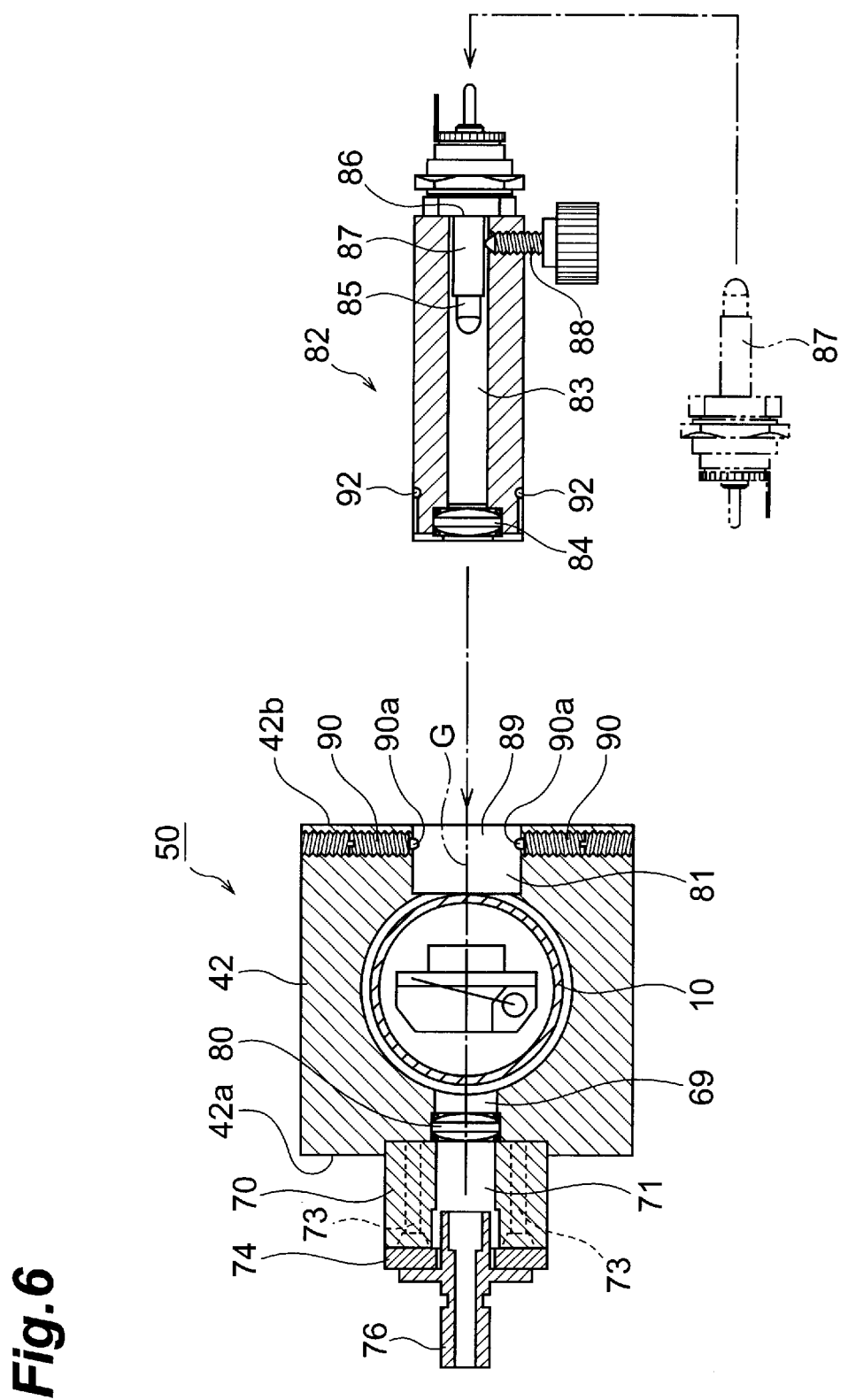
FIG. 6 is a sectional view showing a first embodiment of the deuterium lamp box in accordance with the present invention.

As shown in FIGS. 4 and 6, the front wall 42a of the lamp accommodating body 42 is formed with a light exit opening 69 which penetrates therethrough and opposes the opening window 30 for projecting ultraviolet rays. Further, an aluminum-made light guide tube 70 for extending the light exit opening 69 is secured to the front wall 42a of the lamp accommodating body 42 so as to project forward. The light guide tube 70 is secured to the lamp accommodating body 42 by four screws 73.

Such a light guide tube 70 is employed because it has been known that ozone is generated when ultraviolet rays are emitted in the air and, consequently, the ultraviolet rays should be kept from coming into contact with the air as much as possible. Namely, since a forcible flow of air is generated within the housing 41 by the cooling fan 43, the air is always kept on being newly supplied to a part where ultraviolet rays pass, so that a large amount of ozone is generated, by which ozone fluctuations may occur in the ultraviolet rays.

Therefore, the light guide tube 70 surrounds the region through which the ultraviolet rays pass, and is extended to the front faceplate 41d, so that cooling winds are kept from colliding with the ultraviolet rays as much as possible. Hence, when such a light guide tube 70 is employed, ozone is restrained from occurring in the part through which the ultraviolet rays pass within the housing 41, whereby the emitted light is appropriately kept from fluctuating due to the occurrence of ozone.

Since the light guide tube 70 is extended to the vicinity of the front faceplate 41d, the light guide tube 70 approaches the housing 41, whereby thermal fluctuations of the housing 41 are transmitted to the lamp accommodating body 42 by way of the light guide tube 70. Therefore, a disk-shaped heat insulating member (second heat insulating plate) 74 made of ceramics is secured to the leading end face of the light guide tube 70. The heat insulating member 74 is secured to the light guide tube 70 by screws which are not depicted.

The rear end of an adapter 76 for an optical connector is inserted into the extended opening 71 of the light guide tube 70 from the front end side thereof. The front end of the adapter is exposed from the front faceplate 41d of the housing 41. As a result, the adapter 76 makes it easier to connect with an optical fiber, which is not depicted, in the outside of the housing 41. Also, in cooperation with the light guide tube 70, a structure in which the ultraviolet rays are very hard to be affected by cooling winds is attained within the housing 41, whereby the optical output characteristic can be stabilized quite highly.

A condenser lens 80 is secured within the light exit opening 69 of the lamp accommodating body 42. The condenser lens 80 is disposed close to the deuterium lamp 10, so that it can collect a greater amount of light, whereby the light intensity increases. For integrating the light guide tube 70 and the condenser lens 80 together, the condenser lens 80 may be secured within the extended opening 71 of the light guide tube 70. In this case, the condenser lens 80 attains a state where it is built in the light guide tube 70 beforehand, whereby the workability of assembling further improves.

As shown in FIGS. 5 and 6, the lamp accommodating body 42 is formed with a light entrance opening 81 at a position opposing the light exit opening 69. At the position of the light entrance opening 81, a cylindrical lamp house 82 is detachably attached to the rear wall 42b of the lamp accommodating body 42. Formed within the lamp house 82 is an optical passage 83 linearly extending along an optical axis G passing the light exit opening 69 and light entrance opening 81. A condenser lens 84 is disposed on the front end side of the optical passage 83, whereas the second lamp 85 is disposed on the rear end side thereof. On the optical axis G passing the front condenser lens 80, the center of the rear condenser lens 84 and the light-emitting part of the second lamp 85 are disposed.

The condenser lens 84 fits into the front end of the lamp house 82 so as to be secured therein, whereas the rear end thereof is formed with a lamp insertion port 86, into which the second lamp 85 is inserted. The second lamp 85 is a halogen lamp having a wavelength band of 300 to 1100 nm, and is inserted into a socket 87 so as to be secured therein. Such a lamp 85 is freely attached and detached by means of a fastening screw 88 threaded into the lamp house 82, which makes it easier to replace the lamp.

The lamp box 50 has an attachment hole 89, formed in the lamp accommodating body 42, extending from the light entrance opening 81. A pair of left and right spring plungers 90 are threaded into the lamp accommodating body 42 so as to be secured therein, so that the front ends of the spring plungers 90 face into the attachment hole 89. On the other hand, the outer peripheral face of the leading end of the lamp house 82 is formed with engagement holes 92 for receiving the respective leading ends of the spring plungers 90.

Hence, when the lamp house 82 is inserted into the attachment hole 89, the peripheral face of the lamp house 82 causes pressure pins 90a of the spring plungers 90 to retract against their spring forces. Thereafter, when the lamp house 82 is kept on being further pushed in, the leading ends of the pressure pins 90a enter their corresponding engagement holes 92 of the lamp house 82 due to their spring forces, whereby the lamp house 82 is secured to the lamp accommodating body 42 in a single operation. Thus, the pressure pins 90a of the spring plungers 90 and the engagement holes 92 of the lamp house 82 cooperate together so that the lamp house 82 can freely be pulled out, whereby the lamp 85 and the condenser lens 84 can be replaced at the same time, which improves the work ability in replacing operations.

In order to stabilize the air flow within the housing 41 and improve the cooling efficiency, a radiation fin 93 having a T-shaped cross section extends between the lamp accommodating body 42 and the cooling fan 43 as shown in FIGS. 4 and 5. The radiation fin 93 is formed from an aluminum material. Also, the radiation fin 93 has a partition 93a extending perpendicularly to the bottom faceplate 41a of the housing 41 between the lamp accommodating body 42 and the cooling fan 43, and a roof plate 93b disposed in the upper part of the partition 93a so as to extend in a direction orthogonal to the partition 93a (parallel to the bottom faceplate 41a).

The front end of the radiation fin 93 is in contact with the lamp accommodating body 42, whereas the other end is positioned near the cooling fan 43. Since the radiation fin 93 is formed so as to have a T-shaped cross section as such, cooling winds flow so as to be suppressed by the roof plate 93b from thereabove, whereby they are less likely to reach the upper faceplate 41e of the housing 41 and the upper lid 62 and can be discharged efficiently and speedily.

A second embodiment will now be explained. Here, constituents identical or equivalent to those in the lamp box shown in FIG. 6 will be referred to with numerals or letters identical thereto.

Figure 7:
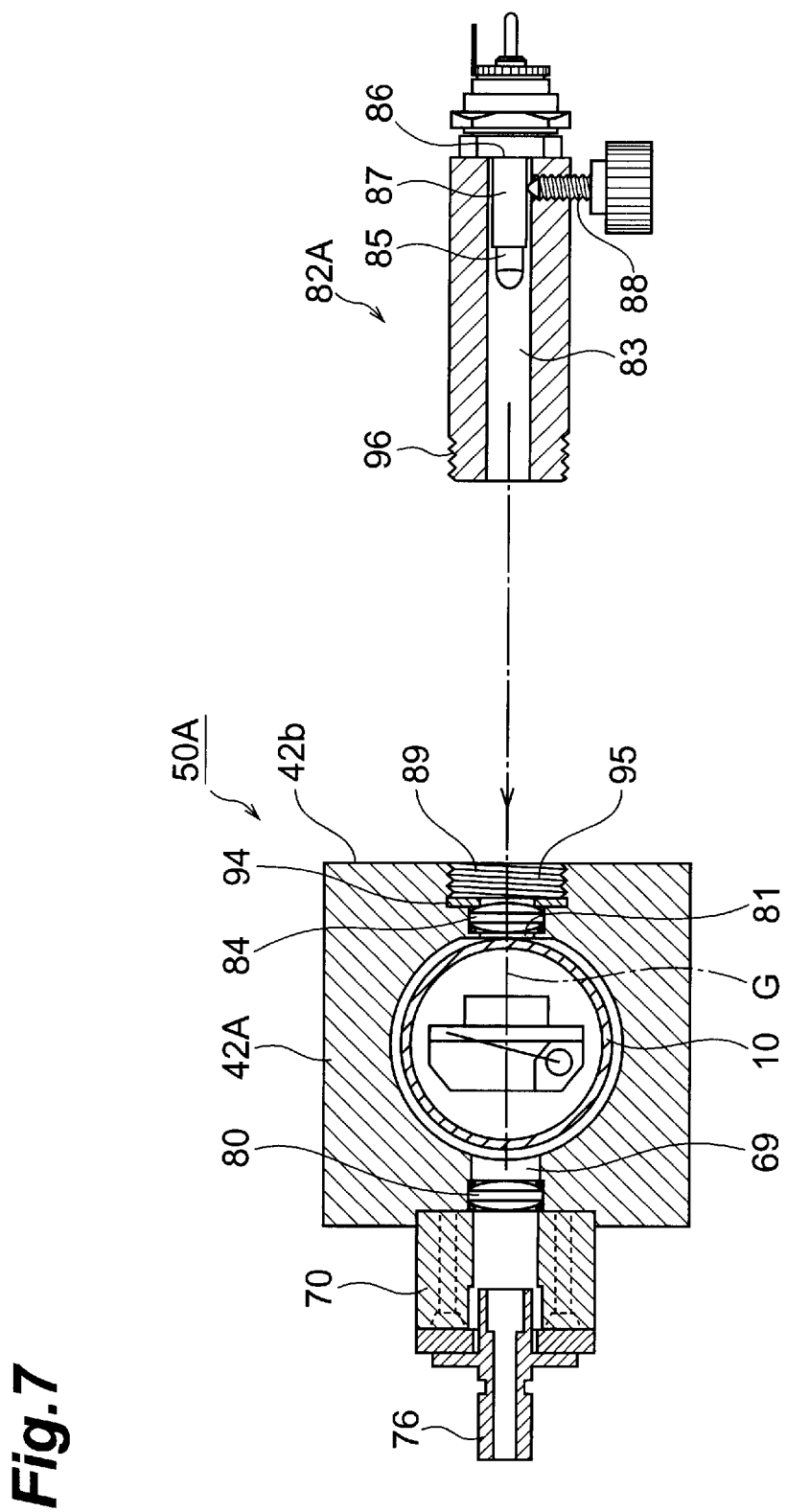
FIG. 7 is a sectional view showing a second embodiment of the deuterium lamp box in accordance with the present invention.

As shown in FIG. 7, the lamp accommodating body 42A of a lamp box 50A is formed with a light entrance opening 81 at a position opposing a light exit opening 69, whereas a cylindrical lamp house 82A is detachably attached to the rear wall 42b of the lamp accommodating body 42A at the position where the light entrance opening 81 is located.

Formed within the lamp house 82A is an optical passage 83 linearly extending along the optical axis G passing the light exit opening 69 and light entrance opening 81. The second lamp 85 is disposed on the rear end side of the optical passage 83, whereas the light-emitting part of the second lamp 85 is disposed on the optical axis G passing the front condenser lens 80. The lamp 85 is inserted into the lamp insertion port 86 formed at the rear end of the lamp house 82A.

Attached to the lamp accommodating body 42A is a condenser lens 84 positioned on the optical axis G so as to face to the light entrance opening 81. The condenser lens 84 is fastened and secured by a washer 94 from the outside. Further, the lamp box 50A has an attachment hole 89, formed in the lamp accommodating body 42A, extending from the light entrance opening 81. The attachment hole 89 is formed with a female thread part 95, whereas the outer peripheral face of the front end of the lamp house 82A is formed with a male thread part 96. When the male thread part 96 is screwed into the female thread part 95, the lamp house 82A is removable from the lamp accommodating body 42A.

A third embodiment will now be explained. Constituents identical or equivalent to those of the lamp box shown in FIG. 6 will be referred to with numerals or letters identical thereto.

Figure 8:
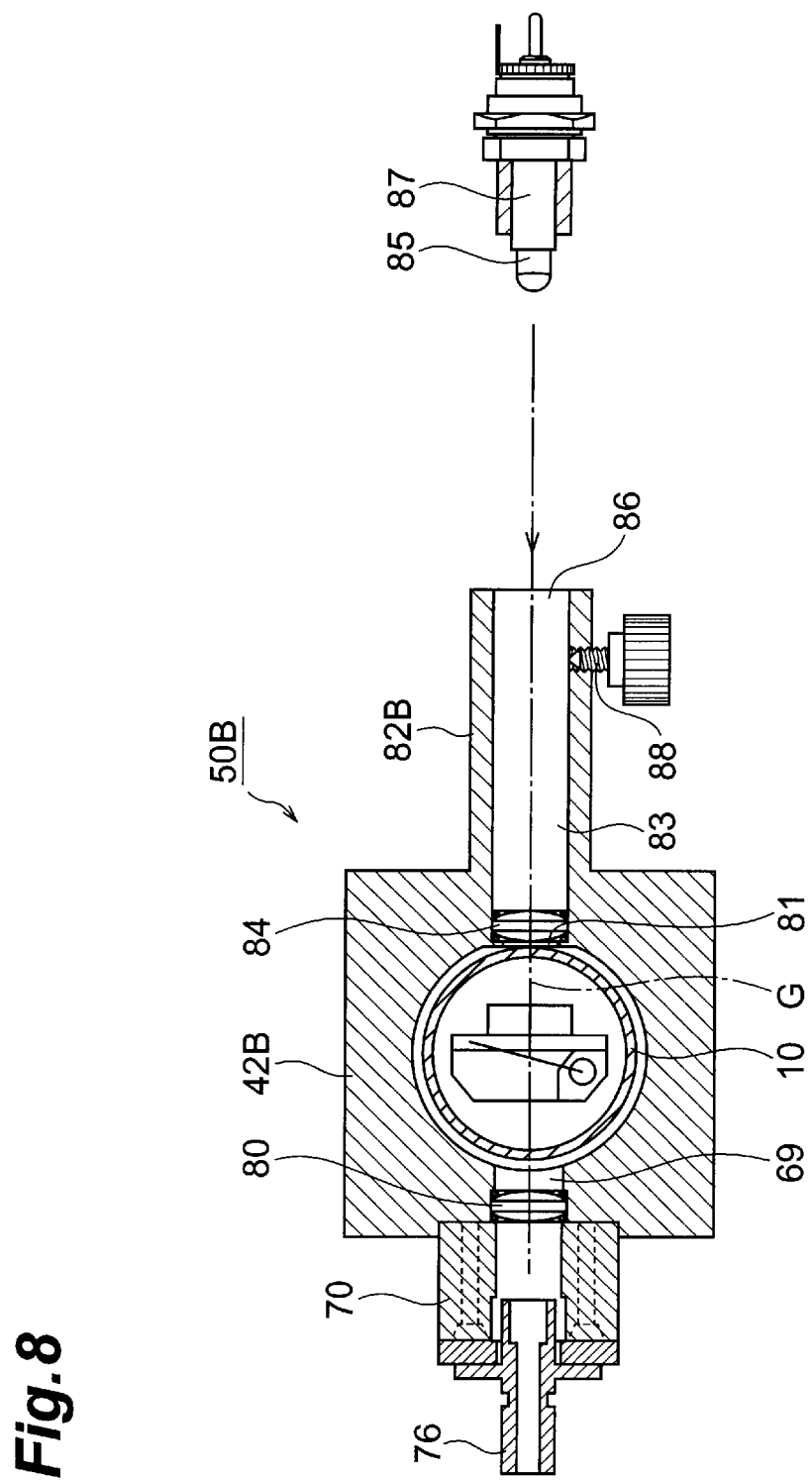
FIG. 8 is a sectional view showing a third embodiment of the deuterium lamp box in accordance with the present invention.

As shown in FIG. 8, the lamp accommodating body 42B of a lamp box 50B is formed with a light entrance opening 81 at a position opposing a light exit opening 69, and is integrally formed with an optical passage 83 outwardly extending from the light entrance opening 81. A condenser lens 84 is secured to a front part of the optical passage 83, whereas a lamp insertion port 86 is formed in a rear part thereof. The optical passage 83 is formed within a cylindrical lamp house 82B integrally formed with the lamp accommodating body 42B. Though the lamp house 82B cannot be removed in this case, it is advantageous in reducing the number of components, so as to lower the cost.

A fourth embodiment will now be explained. Constituents identical or equivalent to those of the lamp box shown in FIG. 6 will be referred to with numerals or letters identical thereto.

Figure 9:
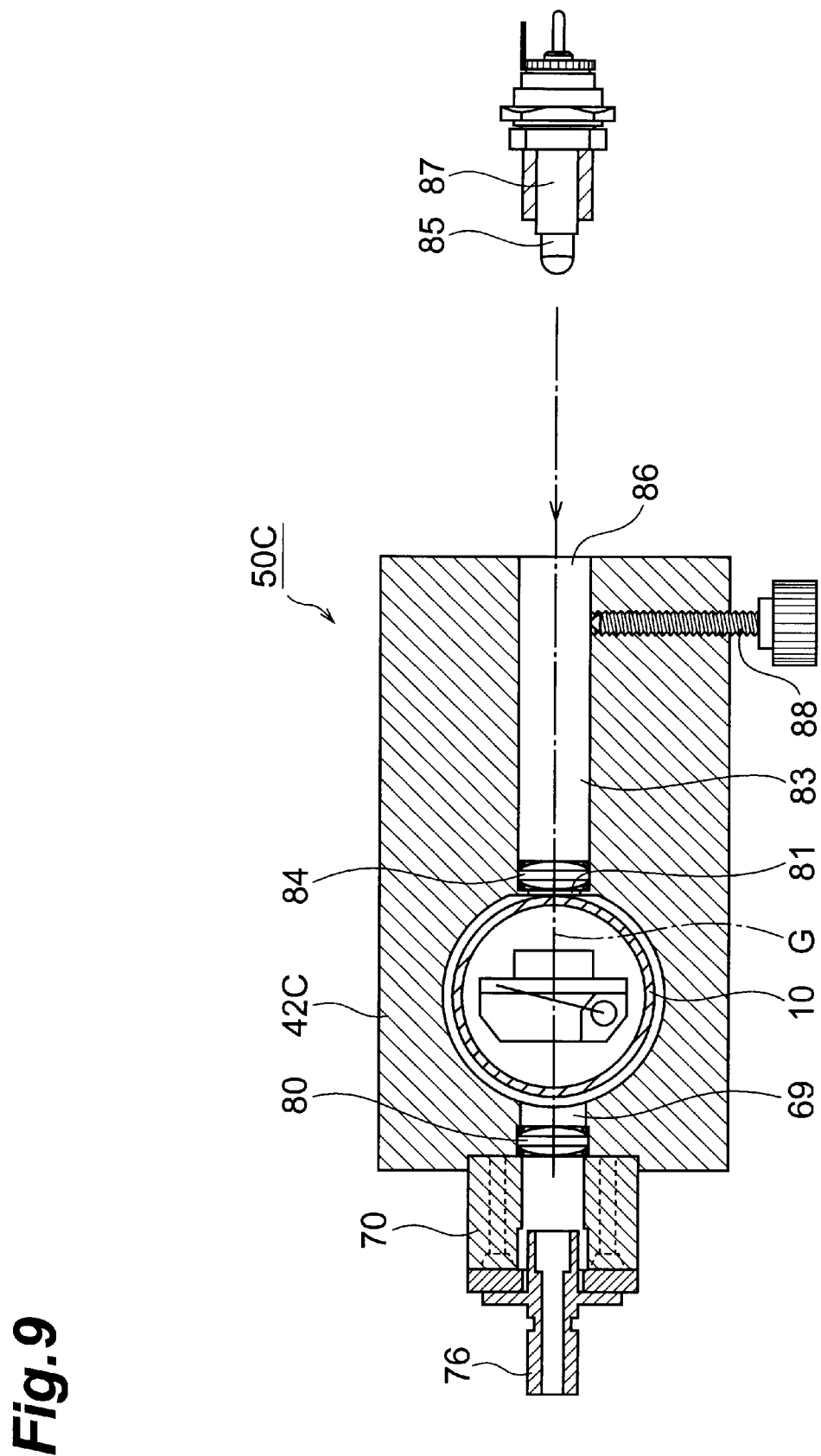
FIG. 9 is a sectional view showing a fourth embodiment of the deuterium lamp box in accordance with the present invention.

As shown in FIG. 9, the lamp accommodating body 42C of a lamp box 50C is formed with a light entrance opening 81 at a position opposing a light exit opening 69, and is integrally formed with an optical passage 83 outwardly extending from the light entrance opening 81. A condenser lens 84 is secured to a front part of the optical passage 83, whereas a lamp insertion port 86 is formed in a rear part thereof. The optical passage 83 is formed within the lamp accommodating body 42C by enlarging the latter. Also, the lamp accommodating body 42C improves its heat-radiating effect by enlarging the surface area.

The present invention is not limited to the above-mentioned embodiments. The second lamp 85 is not limited to the halogen lamp. For example, it may be a halide lamp or a lamp in a visible wavelength band compensating for a wavelength band outside that of the deuterium lamp. Also, the deuterium lamp mounted in the lamp box is not limited to the see-through type, whereas typical deuterium lamps can be mounted to lamp boxes 50 to 50C as long as they are utilized such that the second lamp 85 is not lit.

The deuterium lamp box in accordance with the present invention attains the following effects since it is configured as in the foregoing. Namely, it comprises a lamp accommodating body for inserting a deuterium lamp therein; a light exit opening, formed in the lamp accommodating body, for forwardly letting out light emitted from the deuterium lamp; a light entrance opening, formed in the lamp accommodating body, opposing the light exit opening; a condenser lens disposed on the light entrance opening side on an optical axis passing the light exit opening and the light entrance opening; and a second lamp disposed behind the light entrance opening on the optical axis; thereby enabling the deuterium lamp box to have a high versatility.

The portable light source apparatus includes a lamp box, secured within a housing, for accommodating a deuterium lamp generating a predetermined wavelength of light; and a power unit, secured within the housing, for driving the deuterium lamp; wherein the lamp box comprises a lamp accommodating body for inserting a deuterium lamp therein; a light exit opening, formed in the lamp accommodating body, for forwardly letting out light emitted from the deuterium lamp; a light entrance opening, formed in the lamp accommodating body, opposing the light exit opening; a condenser lens disposed on the light entrance opening side on an optical axis passing the light exit opening and the light entrance opening; and a second lamp disposed behind the light entrance opening on the optical axis; thereby enabling the apparatus to have a high versatility and a wide range of application.

What is claimed is:

1. A deuterium lamp box comprising a lamp accommodating body for inserting a deuterium lamp therein, said deuterium lamp accommodating body having a light exit opening for forwardly letting out light emitted from said deuterium lamp and a light entrance opening opposing said light exit opening; a condenser lens disposed on said light entrance opening side on an optical axis passing said light exit opening and said light entrance opening; and a second lamp disposed behind said light entrance opening on said optical axis.

2. A deuterium lamp box according to claim 1, wherein a lamp house in which said condenser lens and said second lamp are disposed in front and rear parts, respectively, is made detachable with respect to said lamp accommodating body.

3. A deuterium lamp box according to claim 1, wherein said condenser lens is disposed in said lamp accommodating body, wherein said second lamp is disposed in a lamp house, and wherein said lamp house is made detachable with respect to said lamp accommodating body.

4. A deuterium lamp box according to claim 1, wherein said lamp accommodating body is integrally formed with an optical passage extending outward from said light entrance opening, and wherein said condenser lens and said second lens are disposed in front and rear parts of said optical passage, respectively.

5. A deuterium lamp box according to claim 1, wherein said lamp is made insertable with respect to a lamp insertion port formed on said optical axis.

6. A deuterium lamp box according to claim 1, wherein said condenser lens is disposed on said light exit opening side on said optical axis.

7. A deuterium lamp box according to claim 1, wherein said deuterium lamp is of a see-through type which emits light forward and forwardly passes therethrough light incident thereon from behind.

8. A portable light source apparatus including a lamp box, secured within a housing, for accommodating a deuterium lamp generating a predetermined wavelength of light; and a power unit, secured within said housing, for driving said deuterium lamp;

wherein said lamp box comprises a lamp accommodating body for inserting a deuterium lamp therein, said deuterium lamp accommodating body having a light exit opening for forwardly letting out light emitted from said deuterium lamp and a light entrance opening opposing said light exit opening; a condenser lens disposed on said light entrance opening side on an optical axis passing said light exit opening and said light entrance opening; and a second lamp disposed behind said light entrance opening on said optical axis.

9. A portable light source apparatus according to claim 8, having a light guide tube secured to said lamp box so as to extend said light exit opening of said lamp box, and said condenser lens disposed within said light exit opening of said lamp box and held and secured between said light guide tube and said lamp accommodating body.

10. A portable light source apparatus according to claim 8, wherein said deuterium lamp is of a see-through type which emits light forward and forwardly passes therethrough light incident thereon from behind.

* * * * *